(12) United States Patent
Mukouyama (10) Patent No.: US 8,934,256 B2
(45) Date of Patent: Jan. 13, 2015

(54) CARD DEVICE AND POWER SUPPLY METHOD OF CARD DEVICE

(75) Inventor: Motohiro Mukouyama, Tokyo (JP)

(73) Assignee: NEC Corporation, Tokyo (JP)

( * ) Notice: Subject to any disclaimer, the term of this patent is extended or adjusted under 35 U.S.C. 154(b) by 603 days.

(21) Appl. No.: 13/256,699

(22) PCT Filed: Apr. 20, 2010

(86) PCT No.: PCT/JP2010/002842
§ 371 (c)(1),
(2), (4) Date: Sep. 15, 2011

(87) PCT Pub. No.: WO2010/125764
PCT Pub. Date: Nov. 4, 2010

(65) Prior Publication Data
US 2012/0039049 A1    Feb. 16, 2012

(30) Foreign Application Priority Data

Apr. 27, 2009 (JP) .................................. 2009-108142

(51) Int. Cl.
*G06K 19/07* (2006.01)
*G06F 1/26* (2006.01)
*G06F 1/18* (2006.01)

(52) U.S. Cl.
CPC *G06F 1/266* (2013.01); *G06F 1/26* (2013.01); *G06F 1/263* (2013.01); *G06F 1/185* (2013.01)
USPC ............................. 361/737; 361/736; 361/785

(58) Field of Classification Search
USPC .......... 361/736, 737, 785, 796; 235/441, 492; 257/679
See application file for complete search history.

(56) References Cited

U.S. PATENT DOCUMENTS 5,138,142 A  *  8/1992  Sanemitsu ..................... 235/492
6,160,321 A     12/2000  Shin et al.

FOREIGN PATENT DOCUMENTS

| CN | 101031976 A | 9/2007 |
| JP | H04123119 A | 4/1992 |

(Continued)

OTHER PUBLICATIONS

Japanese Office Action for JP2011-511289 mailed on Jan. 22, 2012.

(Continued)

*Primary Examiner* — Ramon Barrera
(74) *Attorney, Agent, or Firm* — Sughrue Mion, PLLC (57) ABSTRACT

One exemplary object of the present invention is to provide a card device which can be shared in main body devices employing different power supply systems, and a power supply method of the card device. The card device according to the present invention includes a flat rectangular card base body (101), an internal circuit (301), an external connector (102), and a main body connector (103). The external connector (102) is provided on an edge (202) positioned on an opening side (201) of a card slot (21) in a state in which the card device is inserted into the card slot (21), and is adapted to be supplied with power from an external power supply. The main body connector (103) is provided on the innermost side of a card slot (200) in a state in which the card device is inserted into the card slot (200), and is supplied with power from a main body device. Power required for an operation of the internal circuit (301) is supplied from one of the main body connector (103) and the external connector (102) which is supplied with power.

5 Claims, 6 Drawing Sheets

(56) References Cited

FOREIGN PATENT DOCUMENTS

| | | | |
|---|---|---|---|
| JP | 5-324145 | A | 12/1993 |
| JP | 6-282357 | A | 10/1994 |
| JP | 7-306923 | A | 11/1995 |
| JP | 8-102590 | A | 4/1996 |
| JP | 9-128114 | A | 5/1997 |
| JP | H1012419 | A | 5/1998 |
| JP | 11-154044 | A | 6/1999 |
| JP | 2007114922 | A | 5/2007 |

OTHER PUBLICATIONS

International Search Report for PCT/JP2010/002842 mailed Jul. 20, 2010.

Chinese Office Action for CN Application No. 201080016645.4 issued on Oct. 18, 2013 with English Translation.

Chinese Office Action for CN Application No. 201080016645.4 issued on Jul. 7, 2014 with English Translation.

* cited by examiner

CARD DEVICE AND POWER SUPPLY METHOD OF CARD DEVICE

TECHNICAL FIELD

The present invention relates to a card device, and more particularly to a card device that needs to be supplied with power, and a power supply method of the card device.

BACKGROUND ART

In recent years, card devices such as PC (Personal Computer) cards that fulfill functions as cards by being supplied with power have become popular (e.g., Patent literatures 1, 2, 3, and 4).

Figure 8:
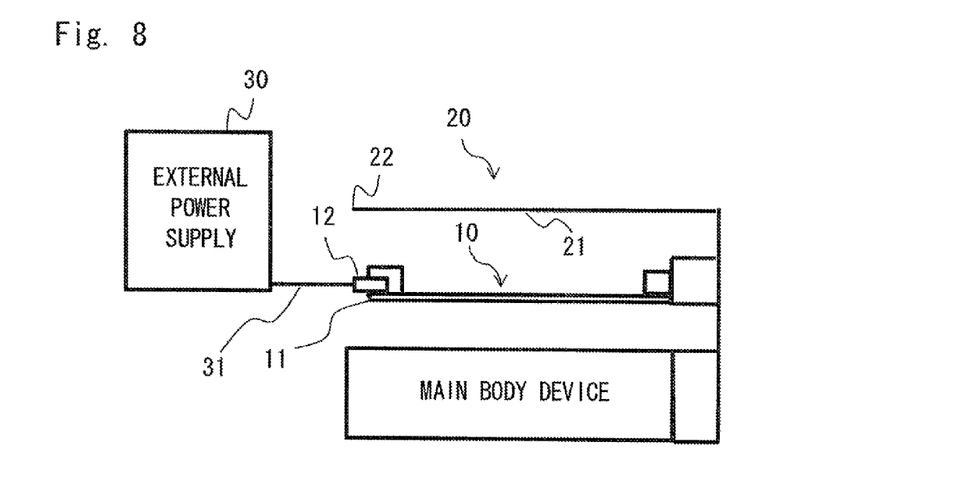
FIG. 8 is a diagram showing a usage mode of a related card device.
Figure 9:
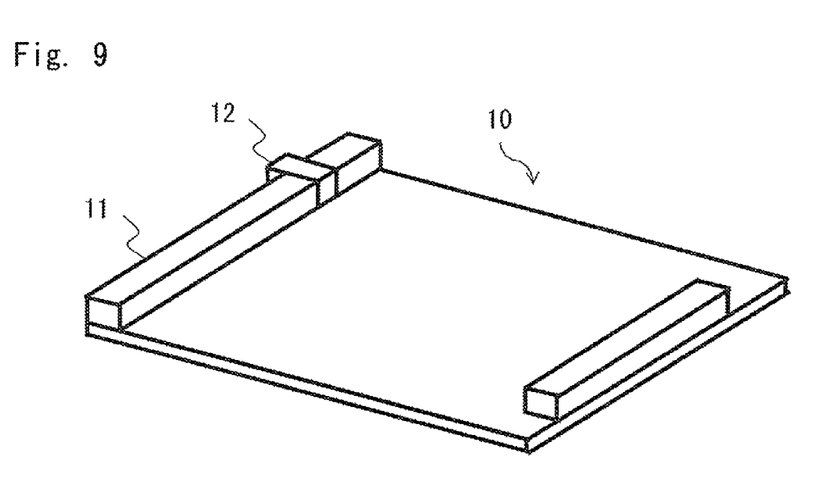
FIG. 9 is a perspective view of the related card device.

FIG. 8 is a diagram showing a state in which a card device 10 is inserted into a card slot 21 of a main body device 20 as one usage mode of a card device. FIG. 8 shows a case in which a single card device 10 is used. FIG. 9 is an external perspective view of the card device 10. The card device 10 includes a power supply connector (hereinafter referred to as an external connector 12) in an edge 11 located in an opening side 22 of the card slot 21 in a state in which the card device 10 is inserted into the card slot 21. A power supply cable 31 of an external power supply 30 provided outside the main body device 20 is connected to the external connector 12. Thus, the card device 10 is supplied with power.

Figure 10:
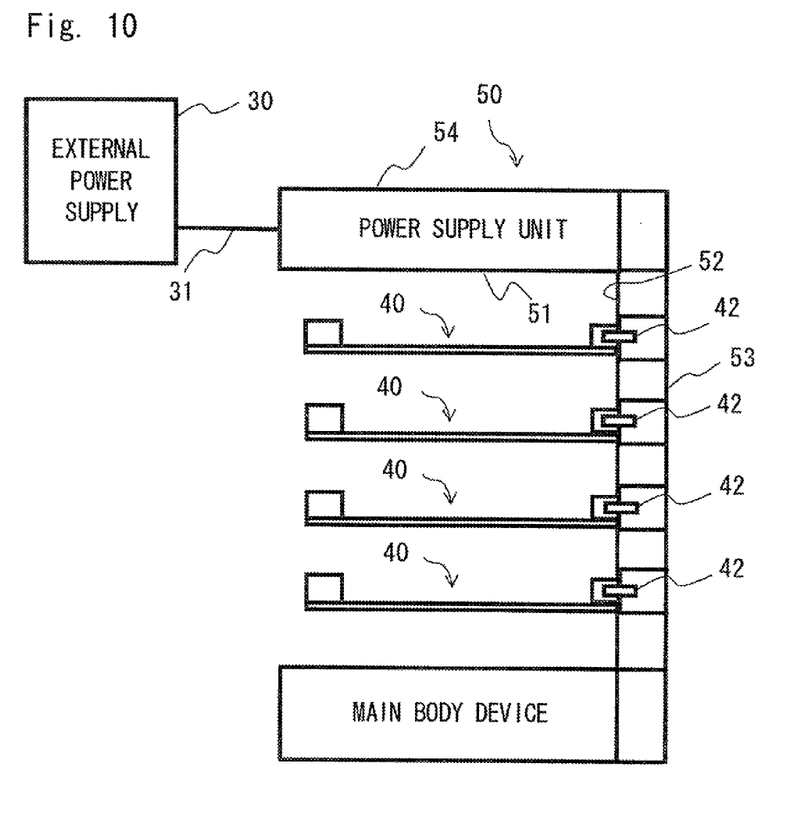
FIG. 10 is a diagram showing a usage mode of a related card device.
Figure 11:
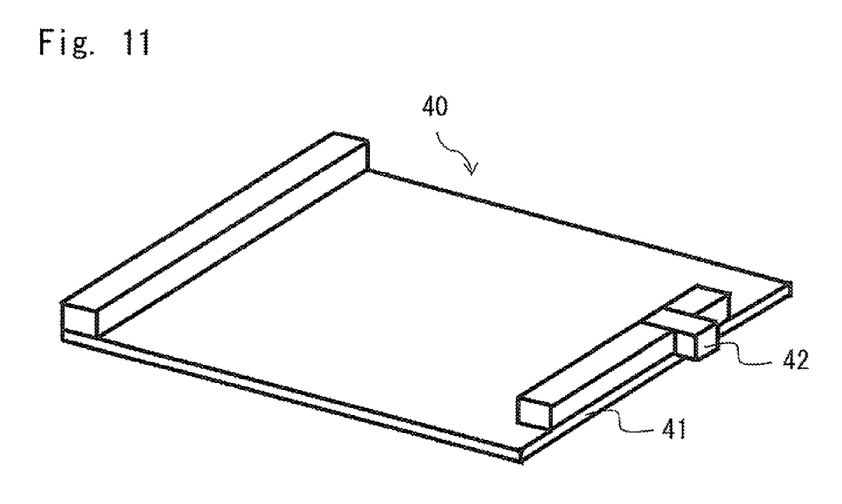
FIG. 11 is a perspective view of the related card device.

FIG. 10 is a diagram showing a case in which a plurality of card devices 40 are used as another usage mode of the card device. A main body device 50 using the plurality of card devices 40 includes a back board part 53 for supplying power in a deepest side 52 of a card slot 51. FIG. 11 is an external perspective view of the card device 40 used in the main body device 50. This card device 40 includes a power supply connector (hereinafter referred to as a main body connector 42) in an edge 41 located in the deepest side 52 of the card slot 51 when the card device 40 is inserted into the card slot 51. When the card device 40 is inserted into the card slot 51, the main body connector 42 is connected to the back board part 53. When power is supplied from an external power supply 30 to a power supply unit 54, power is supplied from the back board part 53 of the main body device 50 to the main body connector 42, from which power is supplied to card device 40.

Patent literature 1 discloses a configuration to allow a host to use a card device that requires power larger than that supplied from the host. Patent literature 1 discloses the card device including a connector used for a connection with the host, and another power supply terminal to externally supply power to an internal circuit.

Patent literatures 2 and 3 each disclose a unit supplied with power from a backboard of a device. Patent literature 4 discloses an expansion board externally supplied with power.

CITATION LIST

Patent Literature

[Patent literature 1]
Japanese Unexamined Patent Application Publication No. 7-306923
[Patent literature 2]
Japanese Unexamined Patent Application Publication No. 5-324145
[Patent literature 3]
Japanese Unexamined Patent Application Publication No. 8-102590
[Patent literature 4]
Japanese Unexamined Patent Application Publication No. 2007-114922

SUMMARY OF INVENTION

Technical Problem

The card devices 10 and 40 shown in FIGS. 9 and 11 include power supply connectors 12 and 42 only in sides 11 and 41 of the card devices 10 and 40. Even when it is desired to share the card device by the main body device 20 shown in FIG. 8 and the main body device 50 shown in FIG. 10 if the card devices have the same function, the power supply methods are different between the card device 10 shown in FIG. 9 and the card device 40 shown in FIG. 11. Accordingly, two kinds of card devices of the card device 10 including the external connector 12 and the card device 40 including the main body connector 42 need to be separately prepared according to the power supply method.

Furthermore, the main body devices 20 and 50 are supplied with power through the external connector 12 of the card device 10 or through the back board part 53 of the main body device 50. However, if the type of the power supply system cannot be known in advance, it is impossible to determine which of the card device 10 shown in FIG. 9 and the card device 40 shown in FIG. 11 should be used.

The card device disclosed in Patent literature 1 includes a host-side connector and another power supply terminal. However, in Patent literature 1, the card device is supplied with power mainly from a connector that is provided in the host side, and the another power supply terminal is provided to be supplied with auxiliary power for backup of an internal circuit (see FIGS. 1, 4, 5, and 6 of Patent literature 1).

Accordingly, even when the card device includes the host-side connector and the another power supply terminal as in Patent literature 1, it can be used only in the main body device 50 shown in FIG. 10. There still remains a problem that another card device having the same function and operating only by an external power supply needs to be prepared for the main body device 20 shown in FIG. 8.

The present invention has been made in order to solve these problems, and aims to provide a card device that can be shared by main body devices employing different power supply systems, and a power supply method of the card device.

Solution To Problem

A card device according to the present invention is configured to be inserted into a main body device, the main body device including at least one card slot and serving a function by the card device inserted into the card slot, the card device including: a flat rectangular card base body; an internal circuit that is provided inside the card base body and needs to be supplied with power for achieving the function of the card device; a main body connector that is provided in one of sides of the card device contacted to an inner surface of the card slot in a state in which the card device is inserted into the card slot, the main body connector being adapted to be supplied with power from the main body device; and an external connector that is provided in an edge of the card device positioned on an opening side of the card slot in a state in which the card device is inserted into the card slot, the external connector being adapted to be supplied with power from an external power supply, in which the card device is supplied with power required for an operation of the internal circuit from one of the main body connector and the external connector which is supplied with power.

A power supply method of a card device according to the present invention is a power supply method of a card device inserted into a card slot and including an internal circuit required to be supplied with power, the method including: interrupting supply of power from an opening side of the card slot when power is supplied from an inner surface of the card slot; and interrupting supply of power from the inner surface when power is supplied from the opening side.

Advantageous Effects of Invention

The present invention is capable of providing a card device that can be supplied with power from any power supply connector regardless of whether the connector supplied with power is an external connector or a main body connector of the card device, and a power supply method of the card device.

DESCRIPTION OF EMBODIMENTS

First Exemplary Embodiment

Figure 1:
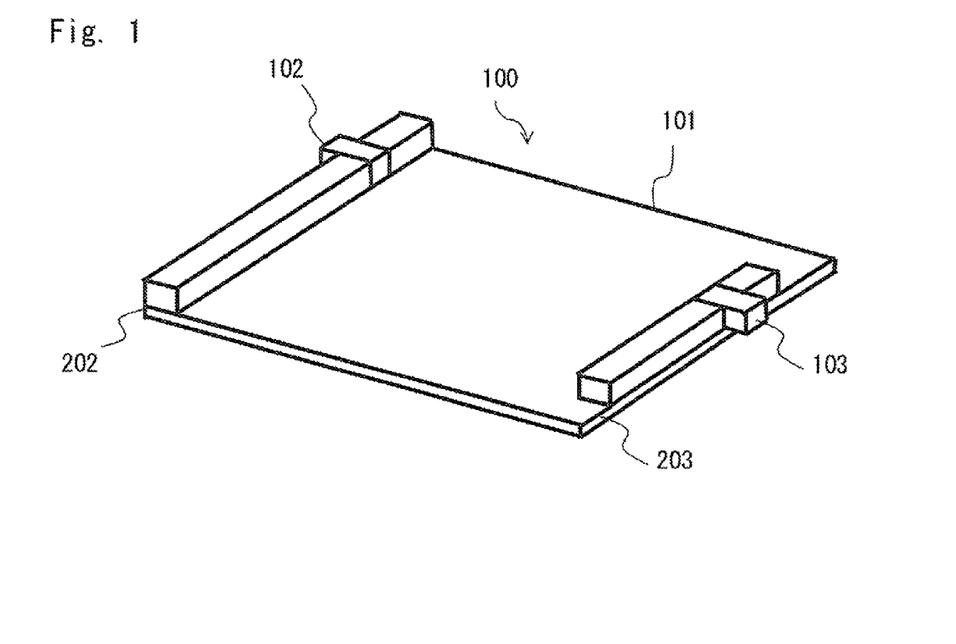
FIG. 1 is a perspective view of a card device according to a first exemplary embodiment.

A first exemplary embodiment of the present invention will be described with reference to the drawings. FIG. 1 is an external perspective view of the first exemplary embodiment of the present invention. A card device 100 includes a card base body 101, an external connector 102, and a main body connector 103.

Figure 2:
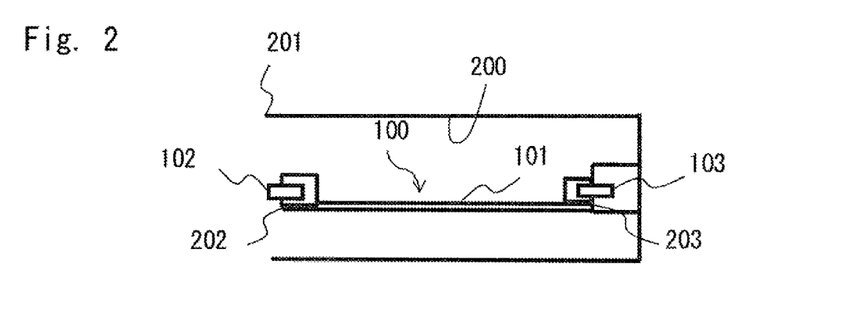
FIG. 2 is a diagram showing the card device according to the first exemplary embodiment.

FIG. 2 is a diagram showing a state in which the card device 100 is inserted into a card slot 200. The card device 100 includes the external connector 102 in a side 202 positioned in an opening 201 of the card slot 200 in a state in which the card device 100 is inserted into the card slot 200. The card device 100 further includes the main body connector 103 in a side 203 positioned in a deepest side of the card slot 200.

Figure 3:
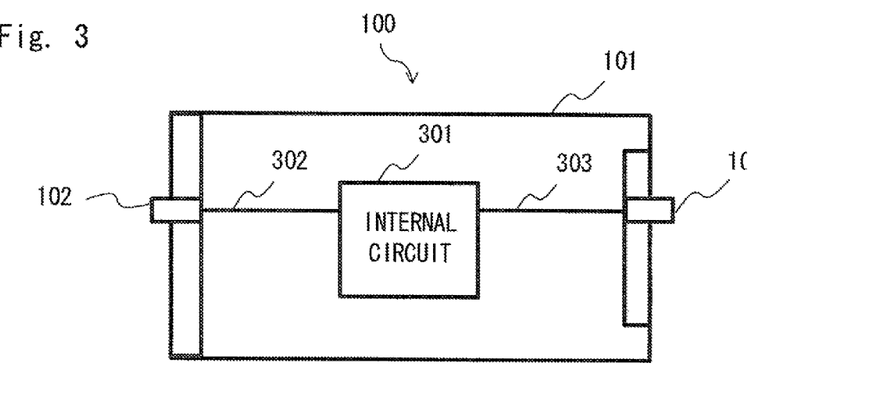
FIG. 3 is a diagram showing inside the card device according to the first exemplary embodiment.

FIG. 3 is a diagram showing an inner structure of the card device 100. The card device 100 includes, in the card base body 101, an internal circuit 301 for achieving a function of the card device 100, a line 302 that connects the external connector 102 and the internal circuit 301, and a line 303 that connects the main body connector 103 and the internal circuit 301.

Figure 4:
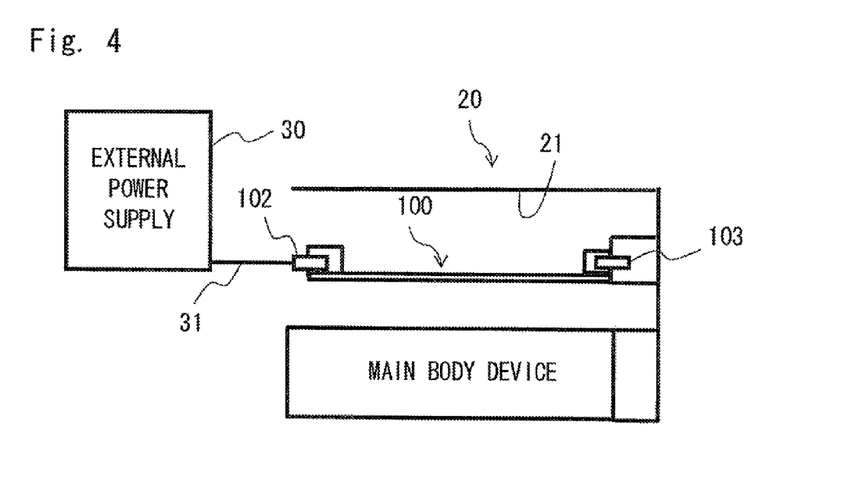
FIG. 4 is a diagram showing a usage mode of the card device according to the first exemplary embodiment.

Next, a usage mode of the card device according to the first exemplary embodiment will be described. FIG. 4 is a diagram showing a usage mode when the single card device 100 is used. As shown in FIG. 4, the card device 100 is inserted into a card slot 21 of a main body device 20 that uses the single card device 100. In this case, since the main body device 20 does not include a back board part connected to the main body connector 103, the card device 100 cannot be supplied with power from the main body connector 103. On the other hand, the card device 100 includes the external connector 102. Thus, the card device 100 can be supplied with power from an external power supply 30 through the external connector 102.

Figure 5:
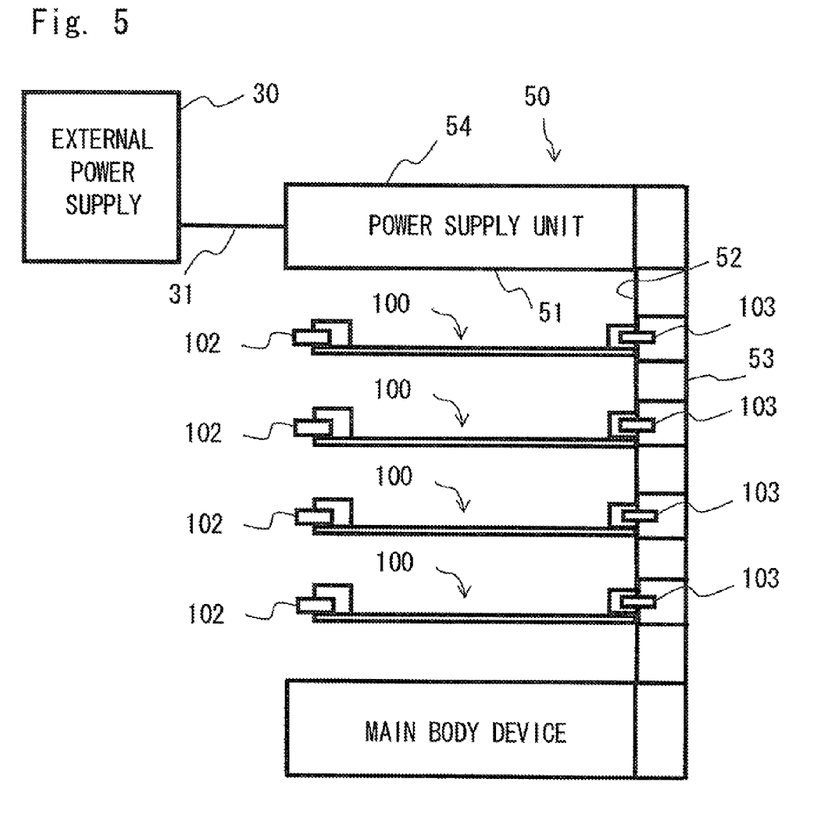
FIG. 5 is a diagram showing a usage mode of the card device according to the first exemplary embodiment.

FIG. 5 is a diagram showing a usage mode when the plurality of card devices 100 are used. As shown in FIG. 5, the plurality of card devices 100 are inserted into a card slot 51 of a main body device 50. When the card devices 100 inserted into the card slot 51 contact a deepest side 52 of the card slot 51, the main body connectors 103 are connected to a back board part 53. In such a configuration, power is supplied from the external power supply to a power supply unit 54, from which the power is supplied to each of the card devices 100 through the back board part 53.

As described above, according to the card device 100 of the first exemplary embodiment, the card device 100 can be shared between the main body devices 20 and 50 employing different power supply systems. While different power supply systems are employed in the usage modes shown in FIGS. 4 and 5, the card device 100 includes both of the external connector 102 and the main body connector 103, both of which can be supplied with power. Accordingly, it is only required to prepare only one type of card device having the same function even when the usage modes are different as shown in FIGS. 4 and 5. Further, the card device 100 needs not be separately used according to the power supply systems of the main body devices 20 and 50, which may simplify the use of the card device.

Second Exemplary Embodiment

Figure 6:
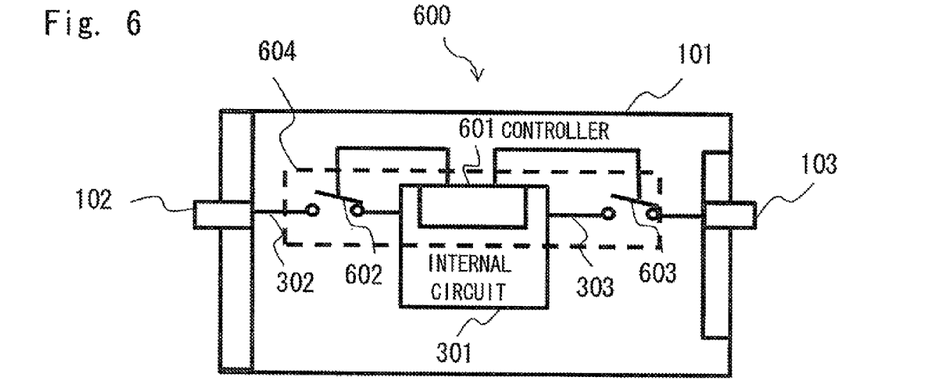
FIG. 6 is a diagram showing inside a card device according to a second exemplary embodiment.

A second exemplary embodiment will be described. FIG. 6 is a diagram showing the second exemplary embodiment. In FIG. 6, a card device 600 further includes a power supply control means 604. The power supply control means 604 includes a switch 602 arranged in a line 302, a switch 603 arranged in a line 303, and a switch controller 601 that controls ON/OFF of the switches 602 and 603.

When supplied with power from an external connector 102 or a main body connector 103, the switch controller 601 turns on the switch provided in the side of the connector that is supplied with power and turns off the switch provided in the side of the connector that is not supplied with power.

Figure 7:
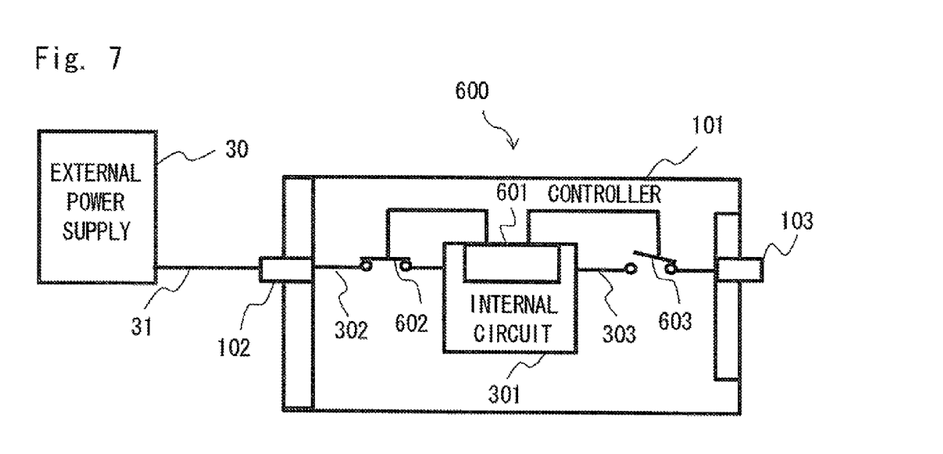
FIG. 7 is a diagram showing a usage mode of the card device according to the second exemplary embodiment.

For example, FIG. 7 shows an operation when an internal circuit 301 is supplied with power from an external power supply 30 through the external connector 102. In such a case, the switch controller 601 only turns on the switch 602 provided in the side of the external connector 102. On the other hand, the switch controller 601 turns off the switch 603 provided in the side of the main body connector 103. Accordingly, the internal circuit 301 is supplied with power from the external power supply 30. The interruption of the side of the main body connector 103 prevents current leakage and noise intrusion.

Although not shown in the drawings, when power is supplied to the internal circuit 301 through the main body connector 103 from a back board part 53, only the switch 603 provided in the side of the main body connector 103 is turned on and the switch 602 provided in the side of the external connector 102 is turned off.

Note that the present invention is not limited to the exemplary embodiments stated above, but can be changed or combined as appropriate without departing from the spirit of the present invention. For example, in FIGS. 1 to 7, the card device includes the main body connector 103 in a side positioned at the innermost part in a state in which the main body connector 103 is inserted into the card slot: However, the card device may include the main body connector 103 in any side that contacts inside the card slot according to the position of the power supply part of the main body device 50. Further, the position supplied with power in the card device is not limited to the edges of the card device but may be any position that contacts with an inner surface of the card slot. The inner surface of the card slot here means a surface inside the card slot that contacts with any of a lower surface, an upper surface, and periphery of the card device. For, example, the upper surface of the card device may include the main body connector 103, which may be supplied with power from a surface inside the card slot contacted with the upper surface.

This application claims the benefit of priority, and incorporates herein by reference in its entirety, the following Japanese Patent Application No. 2009-108142 filed on Apr. 27, 2009.

REFERENCE SIGNS LIST

10 CARD DEVICE
11 EDGE OF CARD DEVICE
12 EXTERNAL CONNECTOR
20 MAIN BODY DEVICE
21 CARD SLOT
22 OPENING OF CARD SLOT
30 EXTERNAL POWER SUPPLY
31 POWER SUPPLY CONNECTOR
40 CARD DEVICE
41 EDGE OF CARD DEVICE
42 MAIN BODY CONNECTOR
50 MAIN BODY DEVICE
51 CARD SLOT
52 INNERMOST SIDE OF CARD SLOT
53 BACK BOARD PART
54 POWER SUPPLY UNIT
100 CARD DEVICE
101 CARD BASE BODY
102 EXTERNAL CONNECTOR
103 MAIN BODY CONNECTOR
200 CARD SLOT
201 OPENING OF CARD SLOT
202 EDGE OF CARD DEVICE
203 EDGE OF CARD DEVICE
301 INTERNAL CIRCUIT
302 LINE
303 LINE
600 CARD DEVICE
601 SWITCH CONTROLLER
602 SWITCH
603 SWITCH
604 POWER SUPPLY CONTROL MEANS

The invention claimed is:

1. A card device that is configured to be inserted into a main body device, the main body device including at least one card slot and serving a function by the card device inserted into the card slot, the card device comprising:
a flat rectangular card base body;
an internal circuit that is provided inside the card base body and needs to be supplied with power for achieving the function of the card device;
a main body connector that is provided in one of sides of the card device contacted to an inner surface of the card slot in a state in which the card device is inserted into the card slot, the main body connector being adapted to be supplied with power from the main body device;
an external connector that is provided in a side of the card device positioned on an opening side of the card slot in a state in which the card device is inserted into the card slot, the external connector being adapted to be supplied with power from an external power supply which is different from power supplied from the main body device; and
a controller controls a connection between the internal circuit and the main body connector, and a connection between the internal circuit and the external connector,
wherein the card device is supplied with power required for an operation of the internal circuit from one of the main body connector and the external connector which is supplied with power,
the function is the same when the internal circuit is supplied with power from the external connector and when the internal circuit is supplied with power from the main body connector, and
the controller connects the internal circuit and the main body connector and interrupts the internal circuit and the external connector when power is not supplied from the external power supply to the external connector and power is supplied from the main body device to the main body connector, and connects the internal circuit and the external connector and interrupts the internal circuit and the main body connector when power is not supplied from the main body device to the main body connector and power is supplied from the external power supply to the external connector.

2. The card device according to claim 1, wherein the main body connector is provided in a side positioned on an innermost of the card slot in a state in which the card device is inserted into the card slot, the side being opposite to a side in which the external connector is provided.

3. The card device according to claim 1, further comprising:
a first switch that is provided between the internal circuit and the main body connector; and
a second switch that is provided between the internal circuit and the external connector,
wherein the controller controls the first switch and the second switch.

4. A power supply method of a card device that is inserted into a card slot and including an internal circuit required to be supplied with power, a main body connector that is provided in a position of the card device contacted to an inner surface of the card slot in a state in which the card device is inserted into the card slot, the main body connector being adapted to be supplied with power from a main body device; and an external connector that is provided in a part of the card device outside the card slot in an opening side of the card slot in a state in which the card device is inserted into the card slot, the external connector being adapted to be supplied with power from an external power supply which is different from power supplied from the main body device, the method comprising:
supplying power from the main body connector to the internal circuit and interrupting supply of power from the external connector to the internal circuit when power is not supplied from the external power supply to the external connector and power is supplied from the main body device to the main body connector; and supplying power from the external connector to the internal circuit and interrupting supply of power from the main body connector to the internal circuit when power is not supplied from the main body device to the main body connector and power is supplied from the external power supply to the external connector, wherein a function of the card device is the same when the internal circuit is supplied with power from the external connector and when the internal circuit is supplied with power from the main body connector.

5. The power supply method of a card device according to claim 4, wherein the card device further comprises:

a first switch that is provided between the internal circuit and the main body connector; and a second switch that is provided between the internal circuit and the external connector, and the method comprises:

controlling the first switch and the second switch.

* * * * *